United States Patent [19]

Holmes et al.

[11] Patent Number: 4,986,252
[45] Date of Patent: Jan. 22, 1991

[54] CHAIN SAW CUTTING ASSEMBLY

[75] Inventors: William K. Holmes, Simi Valley; Albert E. Joneikis, Long Beach, both of Calif.

[73] Assignee: Cushion Cut, Inc., Torrance, Calif.

[21] Appl. No.: 190,865

[22] Filed: May 6, 1988

[51] Int. Cl.$^5$ ............................................. B28D 1/08
[52] U.S. Cl. ..................................... 125/21; 125/13.01
[58] Field of Search ................... 125/21, 12, 13 R, 14; 30/382, 387

[56] References Cited

U.S. PATENT DOCUMENTS

| | | | |
|---|---|---|---|
| 3,763,845 | 10/1973 | Hiestand et al. | 125/14 |
| 3,921,291 | 11/1975 | Henley | 30/382 |
| 4,181,115 | 1/1980 | Weisner | 125/21 |
| 4,273,169 | 6/1981 | Baenen | 30/379.5 |

Primary Examiner—Frederick R. Schmidt
Assistant Examiner—M. Rachuba
Attorney, Agent, or Firm—Nilsson, Robbins, Dalgarn, Berliner, Carson & Wurst

[57] ABSTRACT

A chain saw cutting device and method for flush and square cutting walls and other flat concrete surfaces is disclosed. The chain saw cutting device is typically used in conjunction with a track-mounted circular saw cutting assembly, each being removably mounted either on a trolley which rides on, or directly to a track structure, which track structure is attached to the surface to be cut. The chain saw cutting device has an elongated bar and cutting chain which when mounted are positioned in the same cutting line made by the circular saw assembly. The carriage structure of the chain saw cutting device includes a reversible cutting drive and extends on only one side of a cutting plane containing the chain bar and cutting chain. Hence, the chain saw cutting device permits square cutting along the cutting line as well as flush cutting with respect to a perpendicular side wall, ceiling or floor. Removable chain guard extensions are attachable to protect the user during operation except in the flush and square cutting mode as necessary.

13 Claims, 5 Drawing Sheets

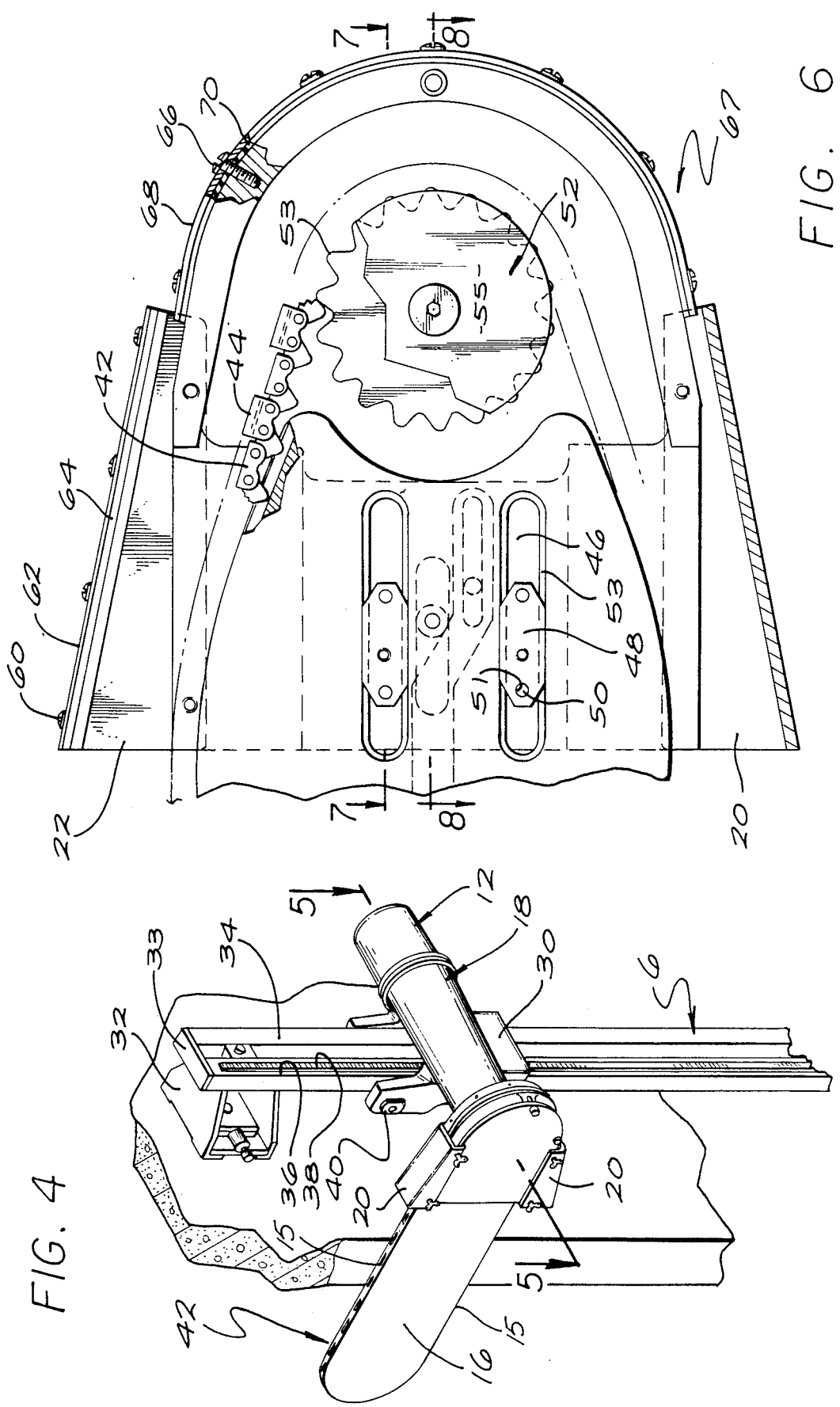

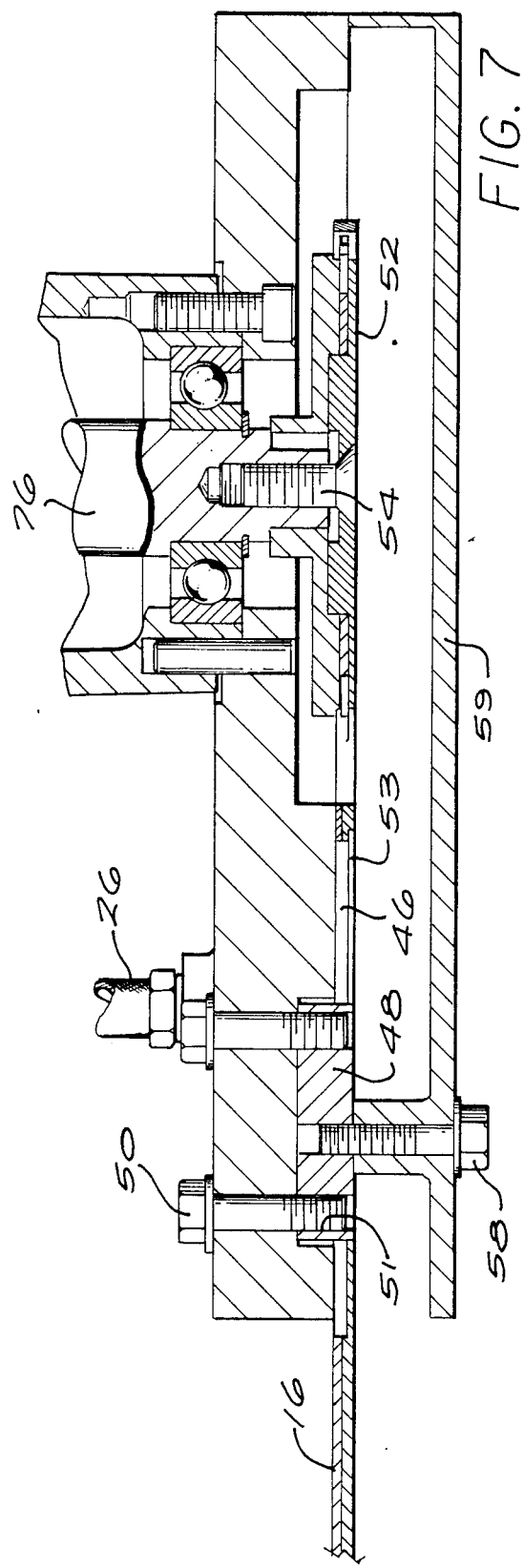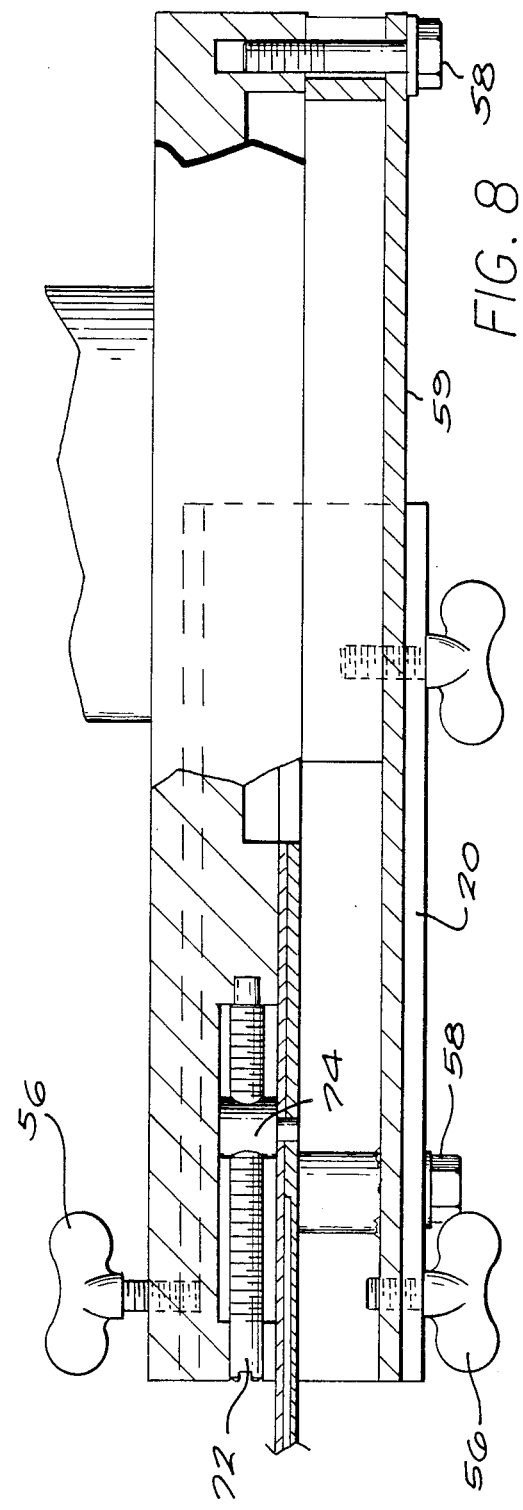

4,986,252

CHAIN SAW CUTTING ASSEMBLY

FIELD OF THE INVENTION

The invention relates to the field of concrete cutting saws and, more particularly, relates to a saw which follows a fixed guide attached to the surface to be cut and is useful in making square cuts and flush cuts where walls meet, ceilings and walls meet, and floors and walls meet.

BACKGROUND OF THE INVENTION

It is often desirable to cut openings in walls, especially those made of concrete, reinforced and otherwise, stone, and other hard materials. One method of cutting such openings utilizes a circular saw assembly which is guided along a track, the track being attached to the surface being cut. A circular blade of diamond-impregnated or other hardened material is turned at a high rate of speed to cut a kerf or cutting line along a desired surface. A variety of methods are used to move the saw assembly along the track.

Methods and apparatus for cutting openings in concrete walls and other similar surfaces are described in U.S. Pat. Nos. 3,763,845 and 3,722,497. These two patents illustrate circular saw assemblies which are mounted on a guide track attached to the surface being cut, and moved along the guide track by means of a gear-driving device. The guide track is laid along a plane parallel to a desired cutting plane. The blade of the circular saw assembly, extending laterally outward and parallel to the track, is then utilized to cut a channel or kerf along a desired cutting plane to a point which is perpendicular to another proposed kerf. Since most openings are rectangular or square in nature, this cutting procedure is accomplished four times prior to removal of the block defined by the four kerfs. The '845 patent also illustrates a particularly useful track structure and trolley for mounting the circular saw assembly to the track.

The problem with utilizing a circular cutting saw to cut the four kerfs, is that, due to the nature of the circular saw blade, a square cut cannot be produced. The circular saw, having a round cutting blade, produces a cut having ends which are not square to the surface of the wall, i.e., do not extend uniformly through the thickness of the wall in a direction perpendicular to the wall surface. In order to remove the slab of concrete from the wall, it is currently necessary to overcut corners on the front surface of the wall so that the arc of the circular blade intersects with the arc of the adjoining cut at the rear portion of the wall. Such overcuts produce stress concentration points, which can lead to cracking of the wall in that area. The overcuts must also be filled for aesthetic purposes, thus requiring additional manpower and materials.

One procedure for producing openings in concrete without overcuts is to use a core drill at the corners to remove material remaining in the kerf. Core drilling is time consuming, however, and openings made in this way still require patching at the corners.

Thus, it is desirable to provide an easier, quicker and more effective procedure and apparatus for producing openings in concrete walls without overcuts or core-drilled corners.

It is another feature of the present invention to provide an apparatus that can be used with trackmounted circular saw assemblies to provide essentially square corner cuts.

It is yet another feature of the present invention to provide an apparatus capable of cutting a kerf along a wall at a point flush with a ceiling, floor or second wall.

SUMMARY OF THE INVENTION

A chain saw assembly and method for cutting square and flush openings in concrete walls and the like is disclosed. The chain saw assembly uses a guide track mounted to the wall to be cut. The assembly includes a carriage guided by the track, an elongated chain bar positioned perpendicular to the surface being cut and a cutting chain driven around the chain bar. The carriage and track extend on only one side of the elongated bar.

One embodiment of the invention includes a chain guard with selectively removable segments. By removing one or more chain guard segments, the user is able to cut a square corner on a cutting line which extends to a ceiling or floor or extends along a wall perpendicular to the surface being cut. In another embodiment of the present invention, the chain bar is affixed to the carriage by tiered T-shaped mounting keys so that the stem of each T-shaped mounting key passes through the chain bar into the carriage where it is held by screws and the top of each T-shaped mounting key is flush against the outside edge of the chain bar opposite the carriage.

BRIEF DESCRIPTION OF THE DRAWINGS

FIGS. 2A and 2B illustrate the use of a track-mounted chain saw cutting device of the present invention to produce square cut corners in concrete walls and the like.

FIG. 4 is a perspective view of the chain saw cutting device constructed according to a preferred embodiment of the present invention and mounted to a track structure.

FIG. 6 is a fragmentary cross sectional view, partially broken away, and taken along the line 6—6 of FIG. 5.

FIG. 7 is a cross-sectional view of the chain saw cutting device taken along the line 7—7 of FIG. 6.

FIG. 8 is a cross-sectional view of the chain saw cutting device taken along the line 8—8 of FIG. 6.

DESCRIPTION OF THE PREFERRED EMBODIMENTS

Figure 1A:
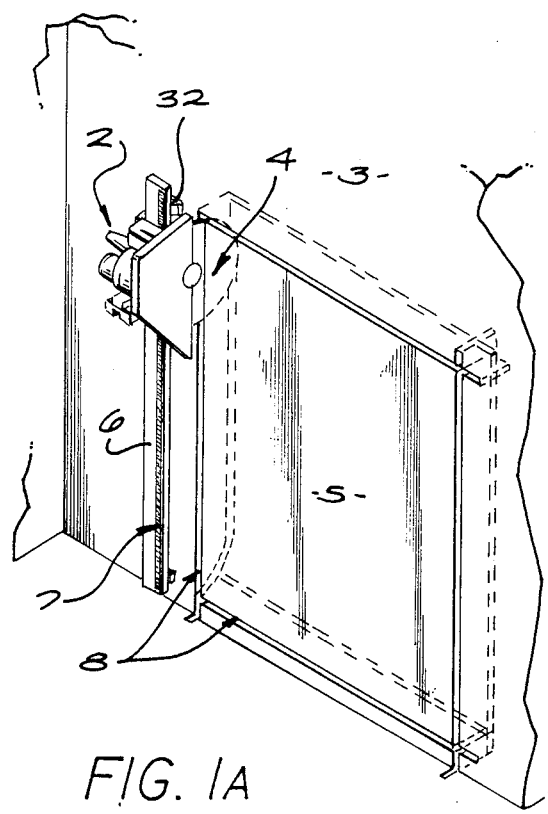
FIGS. 1A and 1B illustrate the prior art method of using a track-mounted circular saw assembly for cutting openings in concrete walls and the like, especially indicating overcuts in the corners.

Referring to FIG. 1A, a prior art trackmounted circular saw assembly and method for cutting openings in concrete walls is illustrated. A circular saw assembly 2 having a circular blade 4 is mounted to a track structure 6. The circular saw assembly 2 includes a worm drive for movement along the track structure 6, specifically along the track teeth 7. The circular saw assembly 2 preferably has a rotatable arm which permits perpendicular movement of the saw with respect to the track structure and facilitates beginning cuts and adjusting the depth of cut made by circular blade 4. The cutting surface of the circular blade 4 is preferably made of a hardened material such as diamond to enable the circular blade 4, when in operation, to cut a kerf or cutting line 8 to separate the concrete wall 3 from the concrete wall slab 5. The concrete wall slab 5 is that portion of the overall wall unit 3 which is being cut and removed to form an opening in wall 3.

Figure 1B:
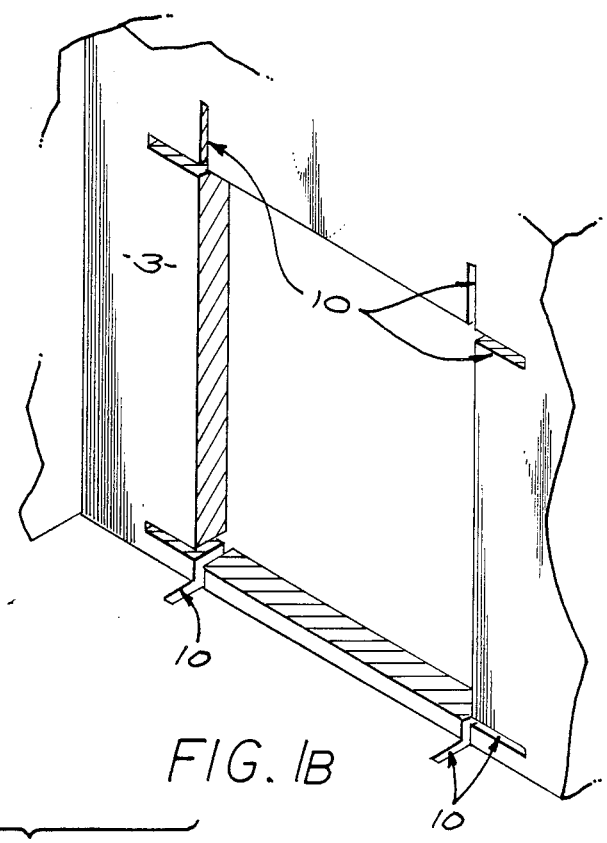

FIG. 1B illustrates the described opening after the concrete wall slab 5 has been removed. Concrete and stone walls are generally at least several inches thick and often reach fifteen inches or more in thickness. In order to remove the concrete wall slab 5, as illustrated in FIG. 1A, it is necessary when using the circular saw assembly 2 to cut past the corners of the area to be removed so that the kerf made by the arc of the circular blade intersects with the respective adjoining kerf cut along both the front and back portions of the concrete wall 3. These overcuts are aesthetically unappealing and often create stress points in the wall that can precipitate damage to areas not marked for removal.

Figure 2A:
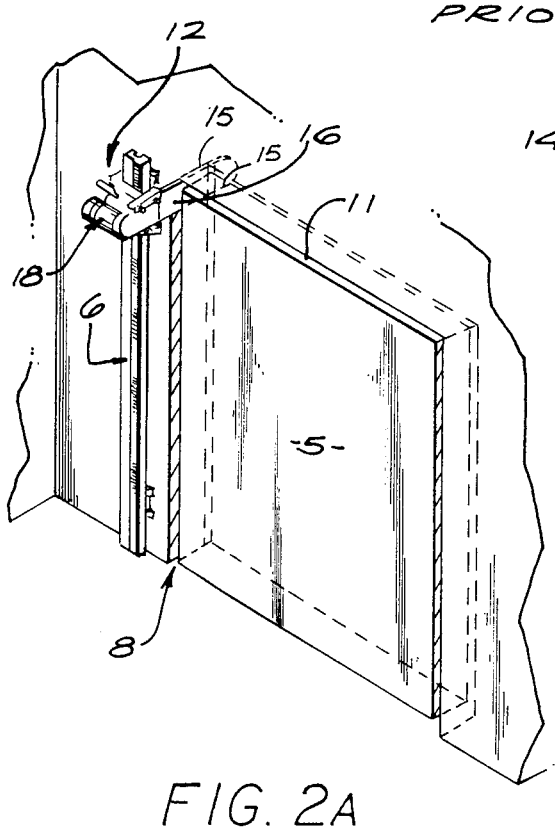

FIG. 2A illustrates a chain saw assembly 12 mounted to the track structure 6. The chain saw assembly 12 comprises a carriage 18, an elongated chain bar 16 having a circumference with a pair of opposed cutting edges 15, a cutting chain extending around the bar at its circumference, and a means for driving the chain around the bar. The carriage 18 contains the drive means for driving the cutting chain around the chain bar. Carriage 18 may also contain the means for moving the carriage along the track structure 6. The chain saw assembly 12 is positioned along the track structure 6 in the same manner as the circular saw assembly 2 is positioned along the track structure 6, as illustrated in FIG. 1A. The elongated chain bar 16 of the chain saw assembly 12 is inserted in the kerf 8. By driving the chain saw assembly 12 upward it is possible to produce an essentially "square" cut along the kerf 8 with respect to the kerf or cutting line 11. That is, the kerf 8 extends to the cutting line 11 at all points through the thickness of the wall but does not extend beyond the cutting line 11, thereby forming a square corner cut.

Figure 2B:
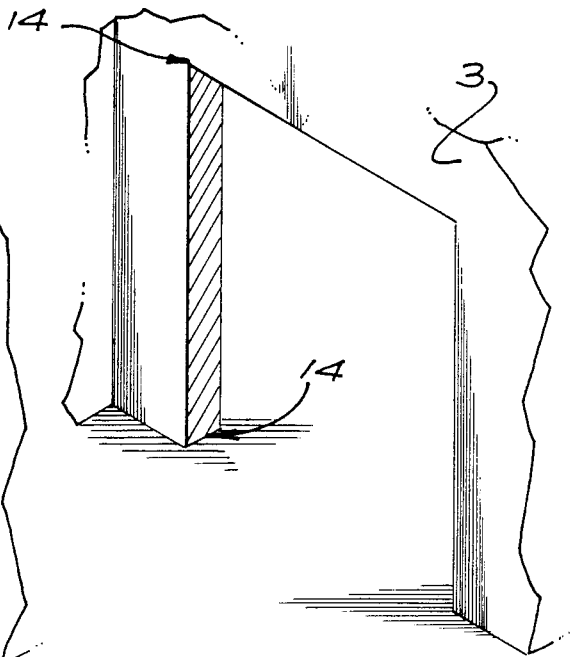

FIG. 2B illustrates the result achieved by the apparatus and method of the present invention in completing the four corner cuts. The concrete wall slab 5 has been removed from concrete wall 3 and resultant square cut corners 14 are shown.

FIGS. 3A-E further illustrate a method of using the chain saw assembly of the present invention to cut square corners for openings in concrete walls and the like, as well as to cut flush along a wall which is perpendicular to another wall, ceiling or floor. For purposes of clarity in FIGS. 3A-E the bulk of the carriage 18 as well as the track structure have been deleted.

Figure 3A:
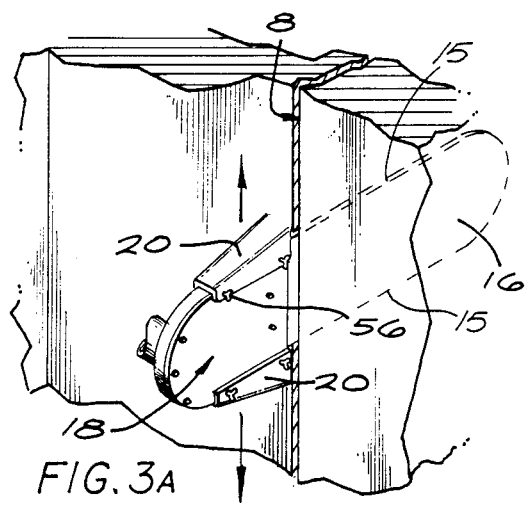
FIGS. 3A–3E illustrate the use of the chain saw cutting device of the present invention to produce square and flush cuts along perpendicular walls, ceilings and walls, and floors and walls.

FIG. 3A illustrates the chain bar 16 with cutting chain (not specifically shown) extending into the cutting line 8, the chain bar with cutting chain being movable along the wall within the plane defined by the cutting line 8. FIG. 3A illustrates a cutting position in which there are no obstacles proximate to the cutting line 8. In this position the operator utilizes chain guard extensions 20 to protect the operator from flying debris during operation. Each chain guard extension 20 is attached to the carriage 18 by at least two wing-headed screws 56.

Figure 3B:
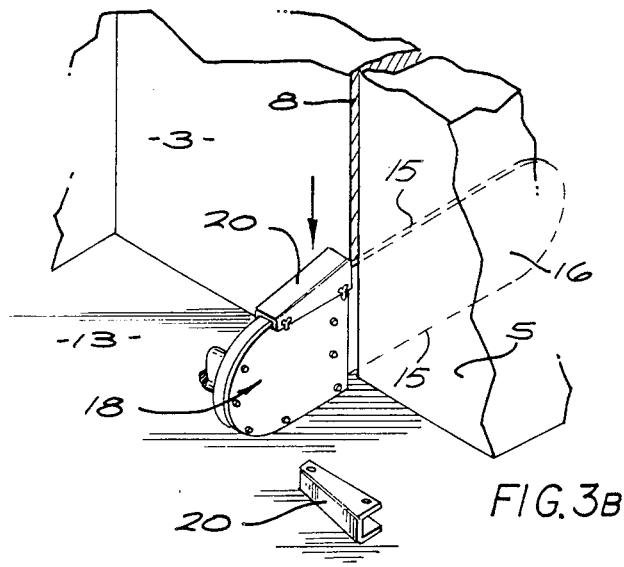

FIG. 3B illustrates a method of cutting a segment, i.e., the concrete wall slab 5, from the concrete wall 3 where a square cut is desired to a point flush with a floor 13 which is perpendicular to the wall. In this case the chain guard extension 20 is removed from the underside of carriage 18, thereby permitting the chain saw to cut along the cutting line 8 until such cutting line is flush with the floor 13.

Figure 3C:
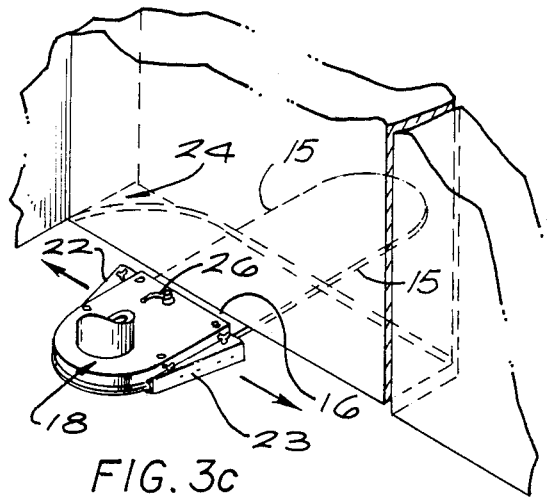
Figure 3D:
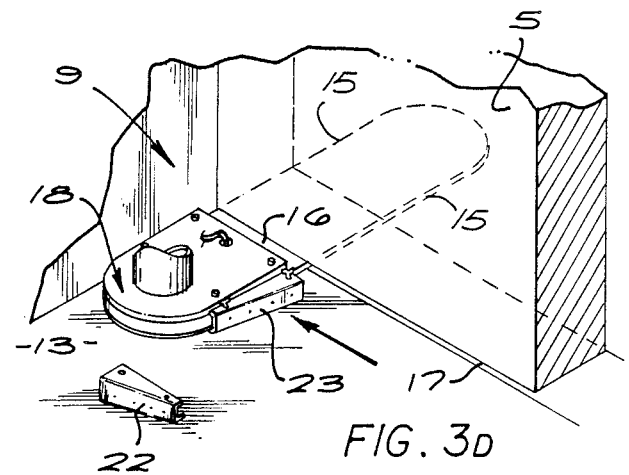

FIGS. 3C and 3D illustrate use of the chain assembly to cut along a cutting line 17 which is parallel to and essentially flush with the floor 13. FIG. 3C also illustrates an exaggerated (for clarity) remainder portion 24 of the cutting line 17 which would be left by first utilizing a circular saw assembly to cut the cutting line 17. L-shaped chain guard extensions 22 and 23 (further described in FIG. 3F) permit the chain saw assembly to cut essentially flush with the floor 13 along the cutting line 17. The chain guard extension 22 is removed to enable the chain saw assembly to make a flush, square cut with respect to the side wall 9.

Figure 3E:
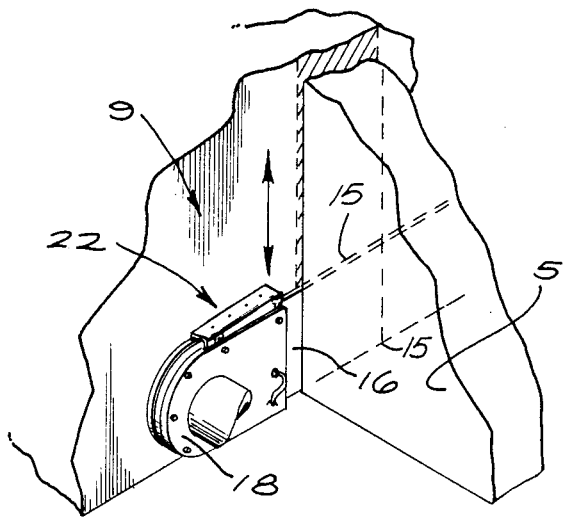

FIG. 3E illustrates use of the chain saw assembly with only chain guard extension 22 in place. Use of a dual direction chain drive permits the chain saw assembly to safely cut both ends of a cutting line without removal of the chain saw cutting assembly from the track structure. Additionally, use of a dual direction chain drive results in long chain bar and cutting chain life and reduces chain drive power requirements.

Figure 3F:
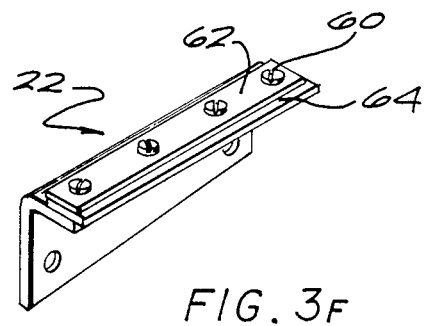
FIG. 3F is a perspective view of a removable chain guard extension.

FIG. 3F illustrates the L-shaped chain guard extension 23 of FIGS. 3C and 3D. The chain guard extension 23 is L-shaped and includes a hard outer layer 62, preferably made of metal, and a flexible inner layer 64, preferably made of a material such as rubber which is capable of deflecting cutting debris as well as providing flexible contact with materials adjacent to the cutting line. The hard outer layer 62 and the flexible inner layer 64 are joined by screws 60 which permit easy exchange of either layer in the event of damage.

FIG. 4 illustrates the chain saw assembly as mounted to a track structure 6. The chain saw assembly 12 comprises a carriage 18 which includes a drive means capable of driving a cutting chain 42 about a chain bar 16 which is attached to the carriage. The chain guard extensions 20 provide additional protection to the operator from flying debris during the cutting operation. The carriage 18 is mounted for movement by a trolley portion 30 which engages a track structure comprising two parallel tracks 34 and 36 attached to at least two wall-mounted brackets 32. The track sections 34 and 36 are secured together at their ends by a removable plate 33 which provides a gap between the two sections. The track section 36 contains rack teeth 38 thereon which are adapted to mesh with a rotating gear on the carriage 18 for driving the chain saw assembly along the length of the track structure 6.

Figure 5:
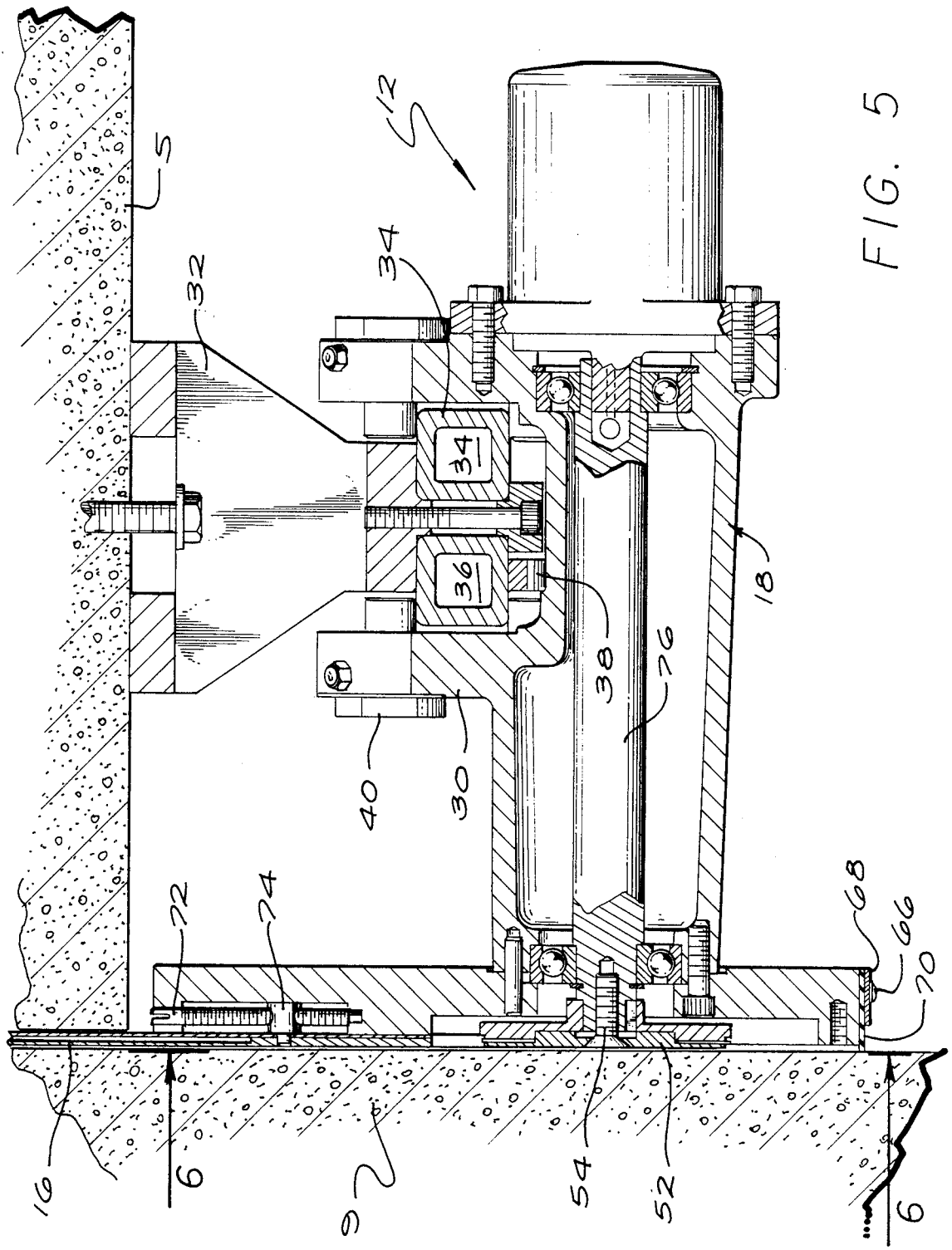
FIG. 5 is a partial sectional view taken along the line 5—5 of FIG. 4 and illustrating the structure for securing the chain saw cutting device to the track structure.

FIG. 5 is a cross-sectional view along line 5—5 of FIG. 4. The chain saw assembly 12 is attached to the trolley portion 30, which includes retractable wheels 40 for easy attachment and travel along the tracks 34 and 36. The wheels 40, preferably with two running on each track segment, may include shaft members placed within a slidable bushing in a side wall extending from the underside of the trolley portion, with the outer side of the side wall having a fixed bushing to retain the wheel within the shaft. This form of track structure and movable trolley is further described in U.S. Pat. No. 3,763,845. It is, however, only one means of mounting and driving the chain saw assembly along a track. Some of the advantages to using the track structure and trolley illustrated include easy exchange of a chain saw assembly with a circular saw assembly, ease in positioning the track structure, and economy of material usage.

FIG. 6 is a cross-sectional view illustrating the structure of the cutting chain, an internal sprocket 52 for driving the cutting chain 42, and T-shaped mounting keys 48 for retaining the chain bar to the carriage 18. The sprocket 52 for driving the cutting chain 42 is covered by a sprocket guard 55 and has teeth 53 which engage a continuous cutting chain 42 to drive the chain circumferentially around the chain bar 16. The sprocket 52 is preferably driven by reversible drive means (not shown), such as a hydraulic or gasoline engine to permit cutting in two directions. The cutting chain 42 has cutting teeth 44 and rides in a groove for that purpose which runs circumferentially around chain bar 16. In order to cut hard materials such as concrete, the cutting teeth 44 are necessarily made of a hard material such as diamond or a diamond-impregnated material. Such cutting teeth can be alternately spaced on the chain links, if desired, in order to reduce the amount of force necessary during the cutting operation to drive the chain around the chain bar. This is accomplished by reducing the amount of surface area of the cutting chain against the surface being cut, here a concrete wall.

A first chain guard 67 comprising an outer metal piece 68 and an inner rubber piece 70 is attached to the carriage by means of screws 66. The chain guard 67 is U-shaped and extends in general around the rear of the sprocket 52. It is narrower than the bar 16 in the plane of FIG. 6 and thus does not extend beyond the chain bar and cutting chain in the direction of carriage movement. This permits the chain 42 to cut squarely to a point that would be flush to the surface of a wall which is perpendicular to the direction of movement.

The chain bar 16 is attached to the carriage by two T-shaped mounting keys 48 which extend through slots 46 in the chain bar and are recessed within step 53 surrounding the slots so that the outer surfaces of the keys are flush with the outer surface of the bar. The mounting keys 48 are held in place by screws 50 extending from the opposite side of the carriage to engage threaded openings 51. The slots 46 permit the chain bar to move toward and away from the sprocket 52 for adjustment of the tension on cutting chain 42.

FIG. 7 is a cross-sectional view taken along line 7—7 of FIG. 6, which illustrates the T-shaped mounting key 48 and surrounding structure in greater detail. The sprocket 52 is attached to the drive shaft 76 by a bolt 54 which also provides a flush surface with respect to the chain bar 16. Additionally, a removable carriage guard 59 is shown as being attached to the carriage by means of a bolt 58. The carriage guard 59 is used when only square cuts along the cutting plane are required and the plane is not flush with any other generally perpendicular or otherwise outwardly extending surface. In actuality, more than one bolt is utilized to retain the carriage guard 59, as shown in FIG. 8, but it remains easy to remove the carriage guard when the flush cutting aspects of the chain saw assembly are utilized.

FIG. 8 is a cross-sectional view taken along the line 8—8 of FIG. 6. FIG. 8 illustrates an adjusting screw 72 and an adjusting nut 74 which are used to adjust the extension of the chain bar 16 with respect to the carriage and thus control the tension on the chain 42. Wing-headed screws 56 are used to retain the extension guard 20.

The elongated chain bar of the present invention can vary in its length, width, and kerf width, as desired. However, as the length increases, stability is lost and additional drive force is required. Hence, the length of the chain bar should be sufficient to cut through the depth of wall expected to be encountered but not appreciably longer, so as to promote efficiency. The chain bar should be wide enough to equal or surpass the width of the carriage. A preferred width is six inches to ten inches and a most preferred width is about eight inches. The width of six to ten inches is preferred in order to provide sufficient space for the carriage. As the width of the chain bar increases additional force is needed to drive the chain, as well as additional material for the chain bar and cutting chain is required. As the width of the bar decreases, wear on the chain bar and cutting chain at the nose of the chain bar is increased.

It will be appreciated that use of a high speed chain saw to cut concrete and other hard materials will produce extensive heat and debris during operation. A preferred means of cooling and cleaning the cutting chain is by flushing water through internal channels in the chain bar and out to the chain bar groove during operation. A hose connection 26 as shown in FIGS. 3C-E and 7 permits water to be introduced through the chain bar in this way. Such a flushing system is especially effective when alternate cutting teeth are used in the chain as described in FIG. 6.

While particular embodiments of the invention have been described, it will be understood that the invention is not limited thereto since modifications may be made and will become apparent to those skilled in the art.

What is claimed is:

1. A chain saw assembly for cutting openings in concrete walls and the like, comprising:
   a track mountable to a wall to be cut;
   a carriage structure guided by the track for movement in at least one preselected direction along the wall, the carriage structure comprising:
   an elongated chain bar having a first major surface facing the track, a second major surface facing away from the track and a circumference with a pair of longitudinal cutting edges, the chain bar being positionable within a kerf formed in the wall so that the cutting edges are perpendicular to the wall;
   a cutting chain extending about the chain bar and movable along its circumference;
   means for driving the cutting chain along the circumference of the chain bar to cut the wall along the kerf; and
   a chain guard structure having at least one auxiliary portion which normally covers part of the second major surface of the chain bar but is removable to place the saw assembly in a first operative condition;
   the track and the carriage structure being disposed exclusively on one side of the second major surface in said first operative condition to cut flush along an adjoining wall.

2. The saw assembly of claim 1 wherein:
   the chain guard structure includes a main portion which covers part of the first major surface and part of the circumference of the chain bar in said first operative condition to protect an operator from debris when cutting flush along the adjoining wall.

3. The saw assembly of claim 2 wherein:
   the main portion of the chain guard extends to the adjoining wall in said first operative condition.

4. The saw assembly of claim 3 wherein:

the main portion of the chain guard has a resilient lip for contacting the adjoining wall.

5. The saw assembly of claim 1 wherein:

the chain bar is held in place on the carriage structure by at least one T-shaped mounting key received within a recessed region of the chain bar so that it is flush with the surface of the chain bar, the mounting key being engageable with screw thread means to hold the chain bar in place.

6. The saw assembly of claim 5 wherein:

the recessed region of the chain bar defines a slot with stepped edge portions for sliding engagement with the T-shaped mounting key.

7. The saw assembly of claim 1 wherein:

the chain guard structure has at least one extension normally carried adjacent one of the cutting edges of the chain bar to protect an operator from debris, said extension being removable to expose said cutting edge and place the saw assembly in a second operative condition wherein a portion of the chain at the cutting edge leads the carriage structure in the direction of movement to cut squarely up to a second adjoining wall which is perpendicular to said direction.

8. The saw assembly of claim 7 wherein:

the means for driving the cutting chain along the chain bar is reversible; and the chain guard structure has one of said extensions normally carried adjacent each of the cutting edges of the chain bar, said extensions being removable individually to cut squarely up to adjoining walls in either of two opposite directions.

9. The saw assembly of claim 8 wherein:

the width of the chain bar in the preselected direction of cutting is between six inches and ten inches.

10. The saw assembly of claim 8 wherein:

the width of the chain bar in the preselected direction of cutting is about eight inches.

11. A chain saw assembly for cutting openings in concrete walls and the like, comprising:

a track mountable to a wall to be cut;

a carriage structure guided by the track for movement in at least one preselected direction along the wall, the carriage structure comprising:

an elongated chain bar having a first major surface facing the track, a second major surface facing away from the track and a circumference with a pair of longitudinal cutting edges, the chain bar being positionable within a kerf formed in the wall so that the cutting edges are perpendicular to the wall;

a cutting chain extending about the chain bar and movable along its circumference;

means for driving the cutting chain along the circumference of the chain bar to cut the wall along the kerf; and a chain guard structure carried with the chain bar and having:

a main portion which covers part of the first major surface and part of the circumference of the chain bar; and at least one auxiliary portion which normally covers the second major surface of the chain bar but is removable to place the saw assembly in a first operative condition;

the track and the carriage structure being disposed exclusively on one side of the second major surface in said first operative condition to cut flush along an adjoining wall.

12. The saw assembly of claim 11 wherein:

the chain guard structure has at least one extension normally carried adjacent one of the cutting edges of the chain bar to protect an operator from debris, said extension being removable to expose said cutting edge and place the saw assembly in a second operative condition wherein a portion of the chain at said cutting edge leads the carriage structure in the directing of movement to cut squarely up to a second adjoining wall which is perpendicular to said direction.

13. The saw assembly of claim 12 wherein:

the means for driving the cutting chain along the chain bar is reversible; and the chain guard structure has one of said extensions normally carried adjacent each of the cutting edges of the chain bar, said extensions being removable individually to cut squarely up to adjoining walls in either of two opposite directions.

* * * * *